US009704530B2

United States Patent
Kumagai et al.

(10) Patent No.: US 9,704,530 B2
(45) Date of Patent: Jul. 11, 2017

(54) MAGNETIC TAPE CARTRIDGE

(71) Applicant: Sony Corporation, Tokyo (JP)

(72) Inventors: Hiroshi Kumagai, Miyagi (JP); Yuji Iwahashi, Miyagi (JP)

(73) Assignee: Sony Corporation, Tokyo (JP)

( * ) Notice: Subject to any disclaimer, the term of this patent is extended or adjusted under 35 U.S.C. 154(b) by 195 days.

(21) Appl. No.: 14/640,154

(22) Filed: Mar. 6, 2015

(65) Prior Publication Data

US 2015/0269965 A1 Sep. 24, 2015

(30) Foreign Application Priority Data

Mar. 24, 2014 (JP) .................................. 2014-059789

(51) Int. Cl.
*G11B 23/107* (2006.01)
(52) U.S. Cl.
CPC .................................. *G11B 23/107* (2013.01)
(58) Field of Classification Search
CPC .................................................... G11B 23/107
See application file for complete search history.

(56) References Cited

U.S. PATENT DOCUMENTS

| | | | | |
|---|---|---|---|---|
| 6,236,539 B1 * | 5/2001 | Morita | ............ | G11B 23/26 242/348.3 |
| 6,663,036 B1 * | 12/2003 | Ishihara | ............ | G11B 23/26 242/348.2 |
| 6,698,676 B2 * | 3/2004 | Shiga | ............ | G11B 23/26 242/348.2 |
| 7,014,137 B2 * | 3/2006 | Ishihara | ............ | G11B 23/107 242/348.2 |
| 7,201,341 B2 * | 4/2007 | Ishikawa | ............ | G11B 15/673 242/332.4 |
| 7,243,871 B2 * | 7/2007 | Moses | ............ | G11B 23/107 242/332.4 |

(Continued)

FOREIGN PATENT DOCUMENTS

| | | |
|---|---|---|
| JP | 2001-243741 A | 9/2001 |
| JP | 2004-047057 A | 2/2004 |

(Continued)

OTHER PUBLICATIONS

Japanese Office Action issued Jul. 5, 2016 in corresponding Japanese application No. 2014-059789 (4 pages).

*Primary Examiner* — William A Rivera
(74) *Attorney, Agent, or Firm* — K&L Gates LLP

(57) ABSTRACT

A magnetic tape cartridge includes a reel that is capable of winding a magnetic tape thereonto, a cartridge main body that is capable of accommodating the reel, a leader pin that is attached to the magnetic tape wound onto the reel and is capable of moving between a first position where the leader pin is accommodated in the cartridge main body and a second position where the leader pin is taken out of the cartridge main body, and a retention clip that is disposed in the cartridge main body and includes an elastic member which is capable of deforming elastically following the movement of the leader pin along with a tip end portion protruding on the path of the movement of the leader pin. The retention clip includes an abutting portion that is capable of abutting on the cartridge main body in response to the movement of the leader pin.

11 Claims, 10 Drawing Sheets

(56) References Cited

U.S. PATENT DOCUMENTS

| | | | | |
|---|---|---|---|---|
| 7,997,519 B2* | 8/2011 | Hiraguchi | ............ | G11B 23/107 242/332.4 |
| 2002/0079396 A1* | 6/2002 | Ridl | ................... | G11B 23/107 242/348.2 |
| 2003/0189120 A1* | 10/2003 | Aaron | ................... | G11B 23/26 242/348.2 |
| 2005/0006515 A1* | 1/2005 | Sasaki | ................. | G11B 23/107 242/348.2 |

FOREIGN PATENT DOCUMENTS

| JP | 2006-018885 | 1/2006 |
|---|---|---|
| JP | 2009-087422 A | 4/2009 |

\* cited by examiner

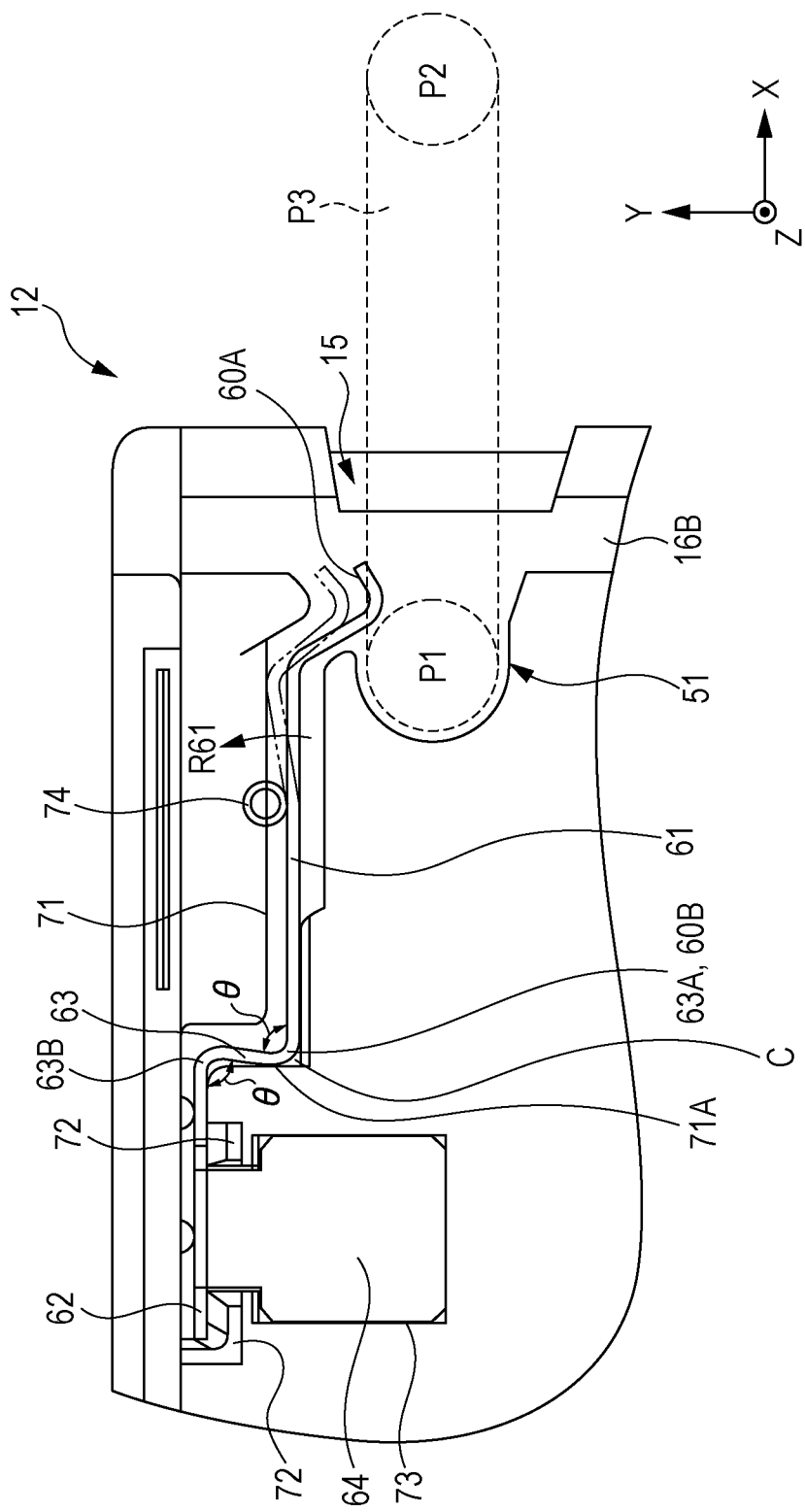

MAGNETIC TAPE CARTRIDGE

CROSS REFERENCES TO RELATED APPLICATIONS

The present application claims priority to Japanese Priority Patent Application JP 2014-059789 filed in the Japan Patent Office on Mar. 24, 2014, the entire content of which is hereby incorporated by reference.

BACKGROUND

The present disclosure relates to a magnetic tape cartridge that is provided with a leader pin in an end portion of a magnetic tape for pulling out the tape.

Since having a large capacity and good retainability, a magnetic tape cartridge is firmly used as a recording medium for retaining a large amount of data when performing backup or the like of a hard disk or a server. There are various configurations and standards for a magnetic tape cartridge. For example, a single reel type magnetic tape cartridge is known in which a magnetic tape is wound onto a single reel, and the reel is accommodated in the cartridge main body in a rotatable manner.

In such a single reel type magnetic tape cartridge, a member is fixed at one end of the magnetic tape in order to pull out the magnetic tape toward a winding reel (take-up reel) disposed on the recording reproduction device side when the single reel type magnetic tape cartridge is in use. When the single reel type magnetic tape is not in use, the member is anchored at a predetermined position by an anchor member that is attached to the vicinity of a tape pull-out port of the cartridge main body.

In a case of an linear tape-open format (LTO format) magnetic tape cartridge, the member attached to the end of the magnetic tape corresponds to a leader pin, and the member that anchors the member at a predetermined position in the cartridge main body corresponds to a retention clip (for example, refer to Japanese Unexamined Patent Application Publication No. 2006-18885).

SUMMARY

In Japanese Unexamined Patent Application Publication No. 2006-18885, the retention clip is loosely fit into an accommodating groove disposed in the cartridge main body. For this, the position of the retention clip may vary in the cartridge main body along with the leader pin moving from the cartridge main body to the recording reproduction device side or from the recording reproduction device side into the cartridge main body. This leaves room for improvement.

It is desirable to provide a magnetic tape cartridge in which variations in the position of the retention clip in the cartridge main body can be suppressed.

According to an embodiment of the present disclosure, there is provided a magnetic tape cartridge including a reel that is capable of winding a magnetic tape thereonto, a cartridge main body that is capable of accommodating the reel, a leader pin that is attached to the magnetic tape wound onto the reel and is capable of moving between a first position where the leader pin is accommodated in the cartridge main body and a second position where the leader pin is taken out of the cartridge main body, and a retention clip that is disposed in the cartridge main body and includes an elastic member which is capable of deforming elastically following the movement of the leader pin along with a tip end portion protruding on the path of the movement of the leader pin, in which the retention clip includes an abutting portion that is capable of abutting on the cartridge main body in response to the movement of the leader pin.

In the magnetic tape cartridge in an embodiment of the present disclosure, the retention clip includes the abutting portion that is capable of abutting on the cartridge main body in response to the movement of the leader pin. Accordingly, when the position of the retention clip varies because of the movement of the leader pin, the abutting portion abuts on the cartridge main body, and this regulates the variations in the position so that the extent of variations does not increase anymore. That is to say, the abutting portion can function as a stopper.

According to the magnetic tape cartridge in an embodiment of the present disclosure, the retention clip includes the abutting portion that is capable of abutting on the cartridge main body in response to the movement of the leader pin. Thus, the abutting portion can function as a stopper, and variations in the position of the retention clip can be suppressed in the cartridge main body.

The effect described here is not necessarily limited and may be any effect described in the present disclosure.

Additional features and advantages are described herein, and will be apparent from the following Detailed Description and the figures.

BRIEF DESCRIPTION OF THE FIGURES

FIG. 13 is a top view of a retention clip and a lower shell of a cartridge main body according to a first modification example.

DETAILED DESCRIPTION

Hereinafter, an embodiment of the present disclosure will be described in detail with reference to drawings. The description will be made in the following order.

1. Embodiment (an example in which a first bent portion and a second bent portion are bent at a right angle or at an approximately right angle)
2. First Modification Example (an example in which a first bent portion and a second bent portion are bent at an acute angle)

Figure 1:
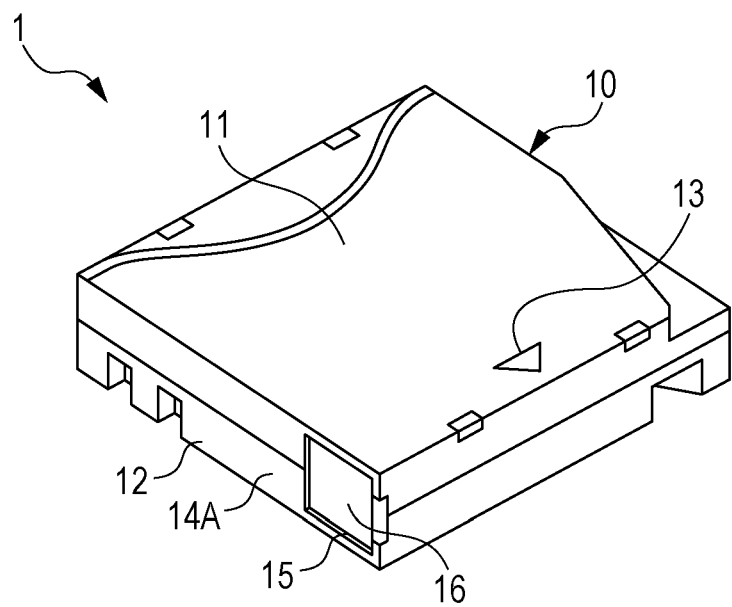
FIG. 1 is a perspective view illustrating the exterior of a magnetic tape cartridge according to an embodiment of the present disclosure when viewed from the upper surface side.
Figure 2:
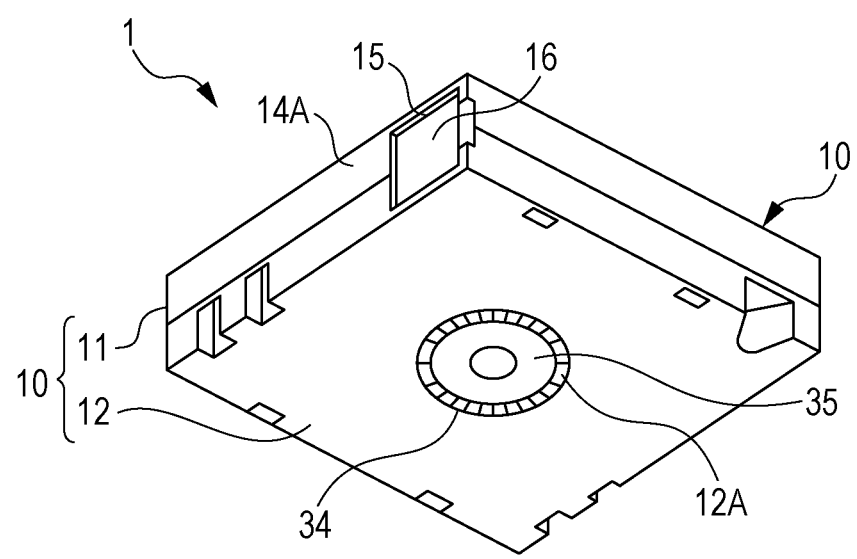
FIG. 2 is a perspective view illustrating the exterior of the magnetic tape cartridge illustrated in FIG. 1 when viewed from the lower surface side.

FIG. 1 and FIG. 2 illustrate the exterior of a magnetic tape cartridge according to the embodiment of the present disclosure when viewed respectively from the upper surface side and the lower surface side. A magnetic tape cartridge 1 is used as a recording medium for retaining data and, for example, includes a cartridge main body 10. The cartridge main body 10 includes an upper shell 11 and a lower shell 12, each of which is made of synthetic resin and is injection-molded. A mark 13 that indicates the direction of insertion of a cartridge into a tape drive device is disposed on the upper front side of the upper shell 11. A tape pull-out port 15 is disposed on a side wall 14A of the cartridge main body 10 to pull one end of a magnetic tape (refer to FIG. 3 since not illustrated in FIG. 1 and FIG. 2) outside. The tape pull-out port 15 can be opened and closed by a sliding door 16.

Figure 3:
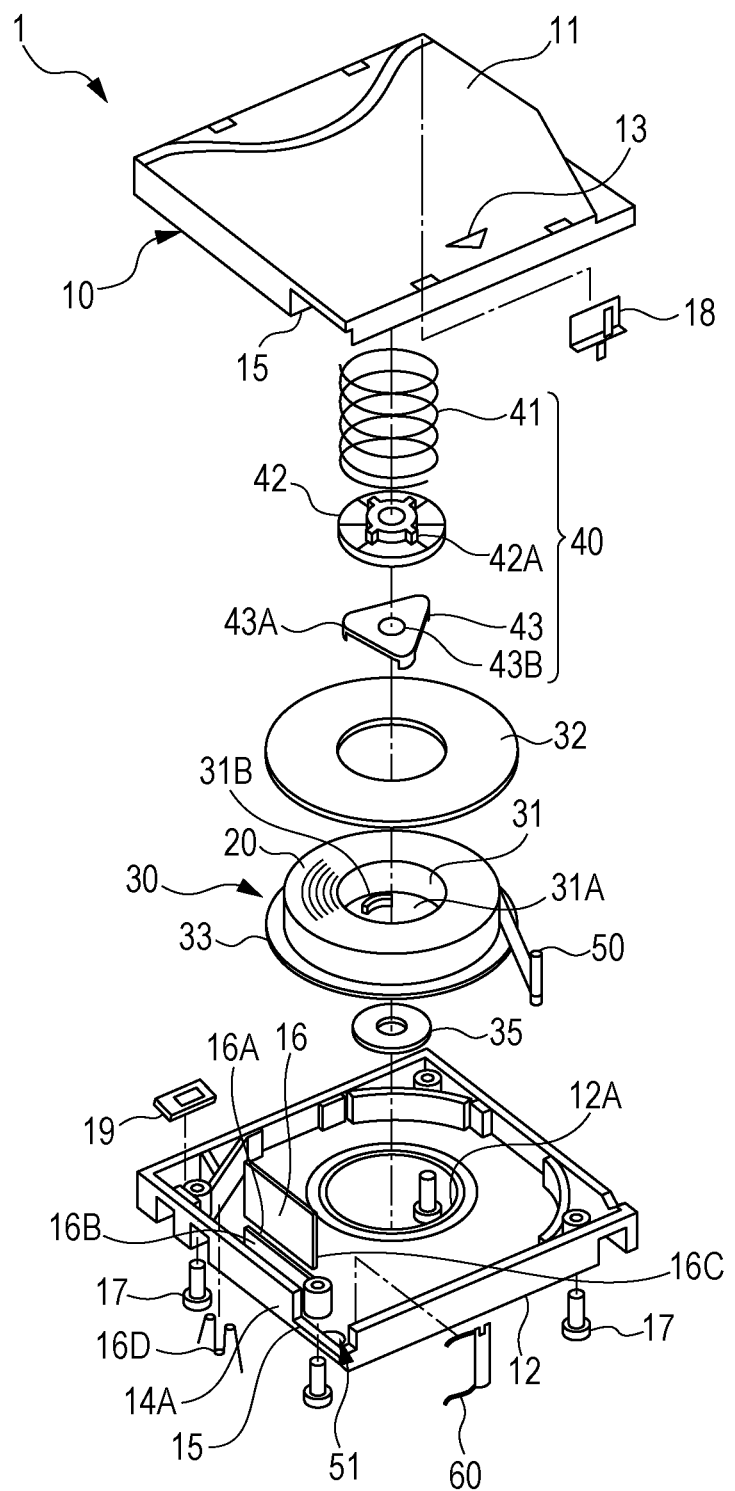
FIG. 3 is an exploded perspective view of the magnetic tape cartridge illustrated in FIG. 1.

FIG. 3 illustrates the internal configuration of the exploded magnetic tape cartridge 1 illustrated in FIG. 1 and FIG. 2. The magnetic tape cartridge 1 includes the cartridge main body 10 and a reel 30 that can wind a magnetic tape 20 thereonto. A reel locking mechanism 40 is disposed between the reel 30 and the upper shell 11 of the cartridge main body 10. A leader pin 50 and a retention clip 60 are disposed in the vicinity of the tape pull-out port 15 of the cartridge main body 10.

The cartridge main body 10 can accommodate the reel 30 onto which the magnetic tape 20 is wound between the upper shell 11 and the lower shell 12. The upper shell 11 and the lower shell 12, for example, are joined by a plurality of screw members 17.

As described above, the tape pull-out port 15 and the sliding door 16 are disposed on the side wall 14A of the cartridge main body 10. A wall portion 16A is disposed inside the side wall 14A and faces the side wall 14A at a predetermined interval. The side wall 14A and the wall portion 16A constitute a guide groove 16B that guides the movement of the sliding door 16. FIG. 3 illustrates only the guide groove 16B on the lower shell 11 side. Although not illustrated, the guide groove 16B is also configured to have the same configuration on the upper shell 12 side.

An engagement portion 16C is disposed in one edge portion of the sliding door 16 to open the sliding door 16 by the engagement thereof with a tape loading mechanism of a tape drive device. A torsion spring 16D that has a shape of W is accommodated in the guide groove 16B to bias the sliding door 16 toward the closed position thereof.

Inside the other side wall 14B of the cartridge main body 10, a safety tab 18 is attached in a slidable manner, and an integrated circuit (IC) substrate 19 is arranged in an inclined manner. The safety tab 18 prevents erroneous deletion of information recorded on the magnetic tape 20. The IC substrate 19 can read and write a content related to the information recorded on the magnetic tape 20 in a contactless manner.

The configuration of the magnetic tape 20 is not particularly limited. As an example, the magnetic tape 20 is configured by a base film such as polyester with a non-magnetic base layer and a magnetic layer disposed on the base film.

The reel 30, for example, includes a reel hub 31 which becomes the core portion of the magnetic tape 20, an upper flange 32 that is bonded to the upper end of the reel hub 31, and a lower flange 33 that is integrally formed with the lower end of the reel hub 31, each of which is made of synthetic resin and is injection-molded. A chucking gear 34 is formed into a shape of a ring at the center of the lower surface of the reel 30 (refer to FIG. 2 since not illustrated in FIG. 3) and engages with a reel rotation drive shaft of the tape drive device (recording reproduction device). The chucking gear 34 is exposed outside through an opening 12A that is disposed at the center of the lower shell 12 as illustrated in FIG. 2. On the inner circumference side of the chucking gear 34, a ring-shaped magnetic metal plate 35 is fixed on the outer surface of the bottom portion of the reel hub 31 through insert molding and magnetically adheres to the reel rotation drive shaft.

The reel locking mechanism 40 suppresses the rotation of the reel 30 when the magnetic tape cartridge 1 is not in use and has a configuration in which, for example, a reel lock spring 41, a reel locking member 42, and a spider 43 are arranged in this order between the inner surface of the upper shell 12 and the reel 30.

The spider 43 has a shape of an approximate triangle. A plurality of leg portions 43A protrudes downwardly from each vertex portion of the spider 43. Each of the plurality of leg portions 43A is inserted into an insertion hole 31A that is formed inside the reel hub 31. A sliding contact surface 43B is disposed on the upper surface of the spider 43. The sliding contact surface 43B is in contact with a protruding portion (not illustrated) that has a shape of an approximately spherical surface and is disposed at the center of the lower surface of the reel locking member 42. This supports the reel locking member 42 in a rotatable manner.

The reel locking member 42 receives the biasing force of the reel lock spring 41 which is a coil spring, and a gear portion 42A that is formed into a shape of a ring on the bottom surface of the reel locking member 42 interlocks with a plurality of gear portions 31B that has a shape of an arc and is stood inside the reel hub 31. This regulates the rotation of the reel 30 when the magnetic tape cartridge 1 is not in use.

When the magnetic tape cartridge 1 is in use, the reel rotation drive shaft of the unillustrated tape drive device presses the leg portion 43A of the spider 43 from therebelow and allows the reel locking member 42 to move upwardly against the biasing force of the reel lock spring 41. Accordingly, the interlocking of the gear portion 42A of the reel locking member 42 and the gear portion 31B of the reel hub 31 is released, and the reel 30 becomes rotatable.

The leader pin 50 is attached in a fixed manner to one end portion of the magnetic tape 20 that is wound onto the reel 30. The leader pin 50 is accommodated in a pin retaining portion 51 in an upright state when the magnetic tape cartridge 1 is not in use. The pin retaining portion 51 is disposed inside the tape pull-out port 15 of the cartridge main body 10. The pin retaining portion 51, for example, is a circular recess that is disposed on the inner surface of the top wall (inner surface of the upper shell 11) and on the inner surface of the bottom wall (inner surface of the lower shell 12) of the cartridge main body 10. The retaining portions 51 can respectively accommodate the upper end portion and the lower end portion of the leader pin 50.

The retention clip 60 is disposed in the vicinity of the pin retaining portion 51 in the cartridge main body 10 and retains the leader pin 50 in a manner in which the leader pin 50 can be attached to and detached from the pin retaining portion 51.

Figure 4:
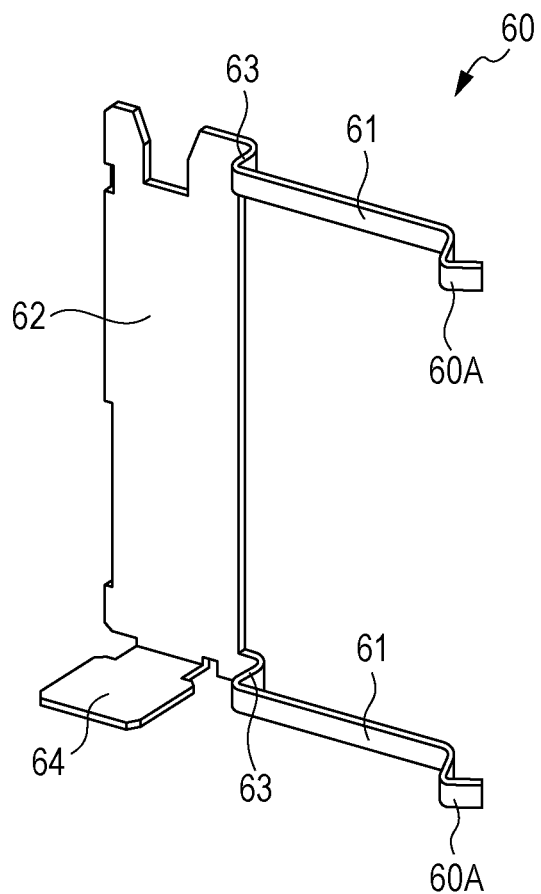
FIG. 4 is a perspective view illustrating an enlarged retention clip illustrated in FIG. 3.
Figure 5:
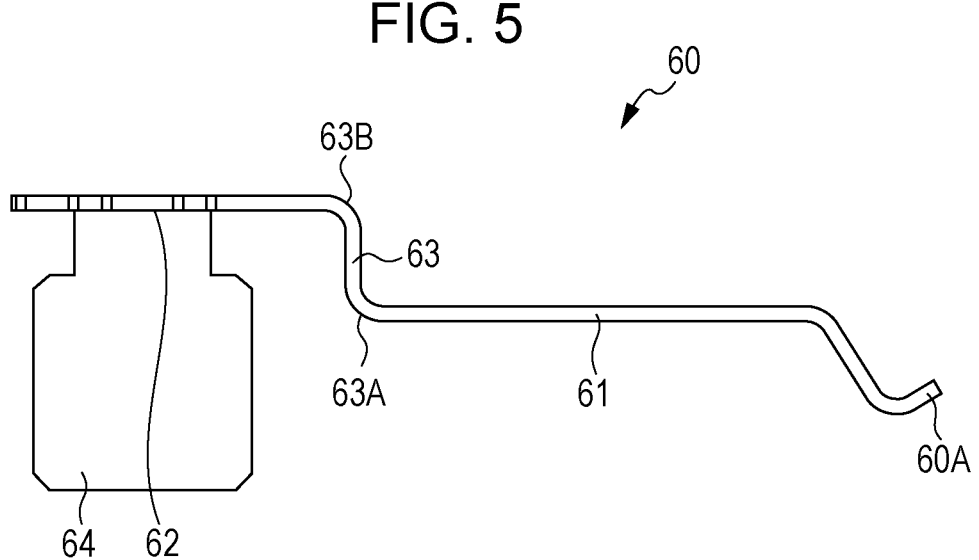
FIG. 5 is a top view of the retention clip illustrated in FIG. 4.

FIG. 4 illustrates the enlarged retention clip 60 illustrated in FIG. 3. FIG. 5 illustrates the configuration of the retention clip 60 illustrated in FIG. 4 when viewed from the top. The retention clip 60, for example, is formed by performing punch presswork on a metal plate such as stainless steel and the like and includes an elastic member 61, an attaching member 62, a connecting member 63, and a plate surface member 64.

The elastic member 61 elastically deforms to retain the leader pin 50 in a manner in which the leader pin 50 can be attached to and detached from the pin retaining portion 51. The elastic member 61 includes a tip end portion 60A that is curved at one end of the flat part, which becomes a flat spring, of the elastic member 61. The other end of the flat part is connected to the connecting member 63. The attaching member 62 is attachable along the inner surface of the cartridge main body 10 in an upright state. The connecting member 63 connects the attaching member 62 and the elastic member 61 through a first bent portion 63A and a second bent portion 63B that will be described below. The plate surface member 64 retains the position of the retention clip 60 and is bent at a right angle or at an approximately right angle from the lower end of the attaching member 62 along the bottom surface of the lower shell 12 of the cartridge main body 10. The shape of the plate surface member 64 is not particularly limited to a flat surface and may be any shape besides a rectangle.

Figure 6:
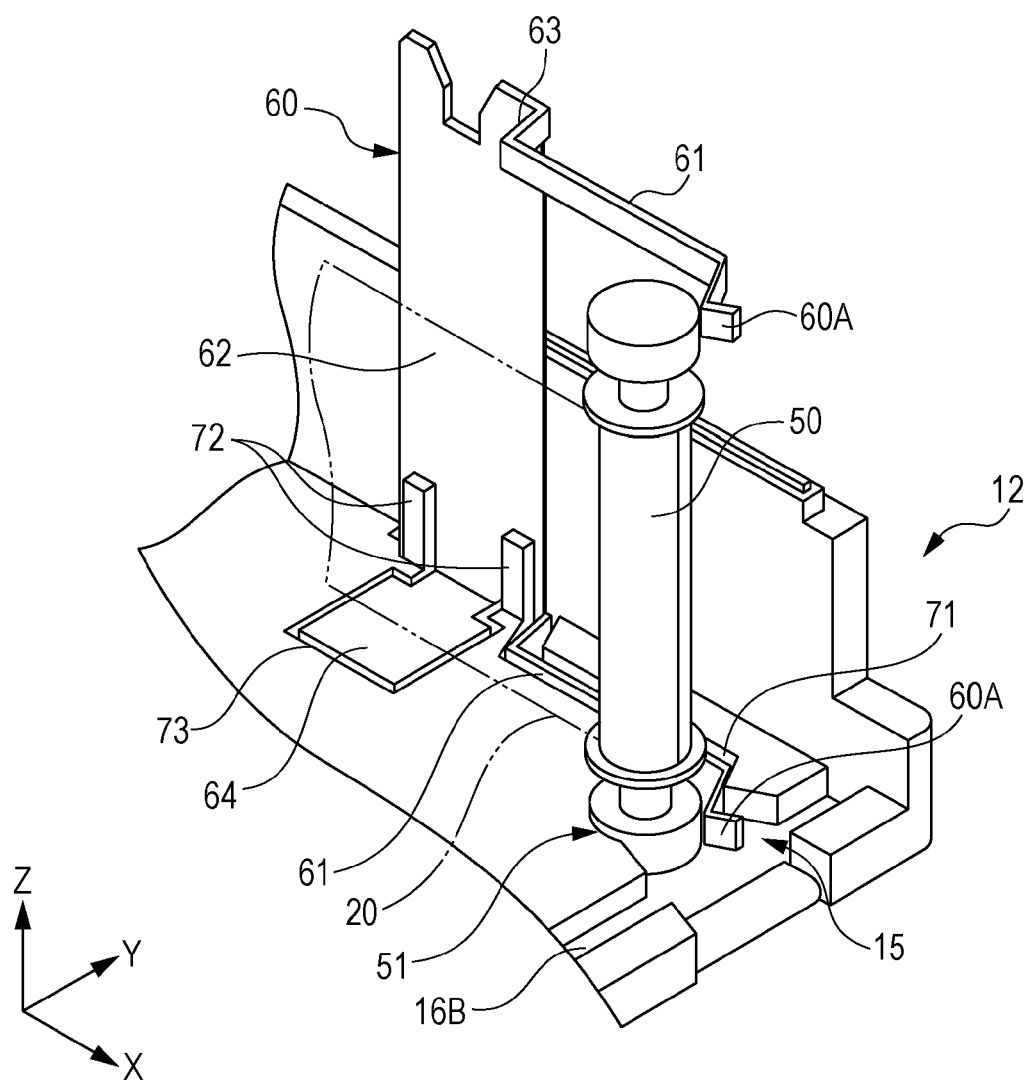
FIG. 6 is a perspective view illustrating a state where a leader pin and the retention clip illustrated in FIG. 3 are mounted on a lower shell of a cartridge main body.
Figure 7:
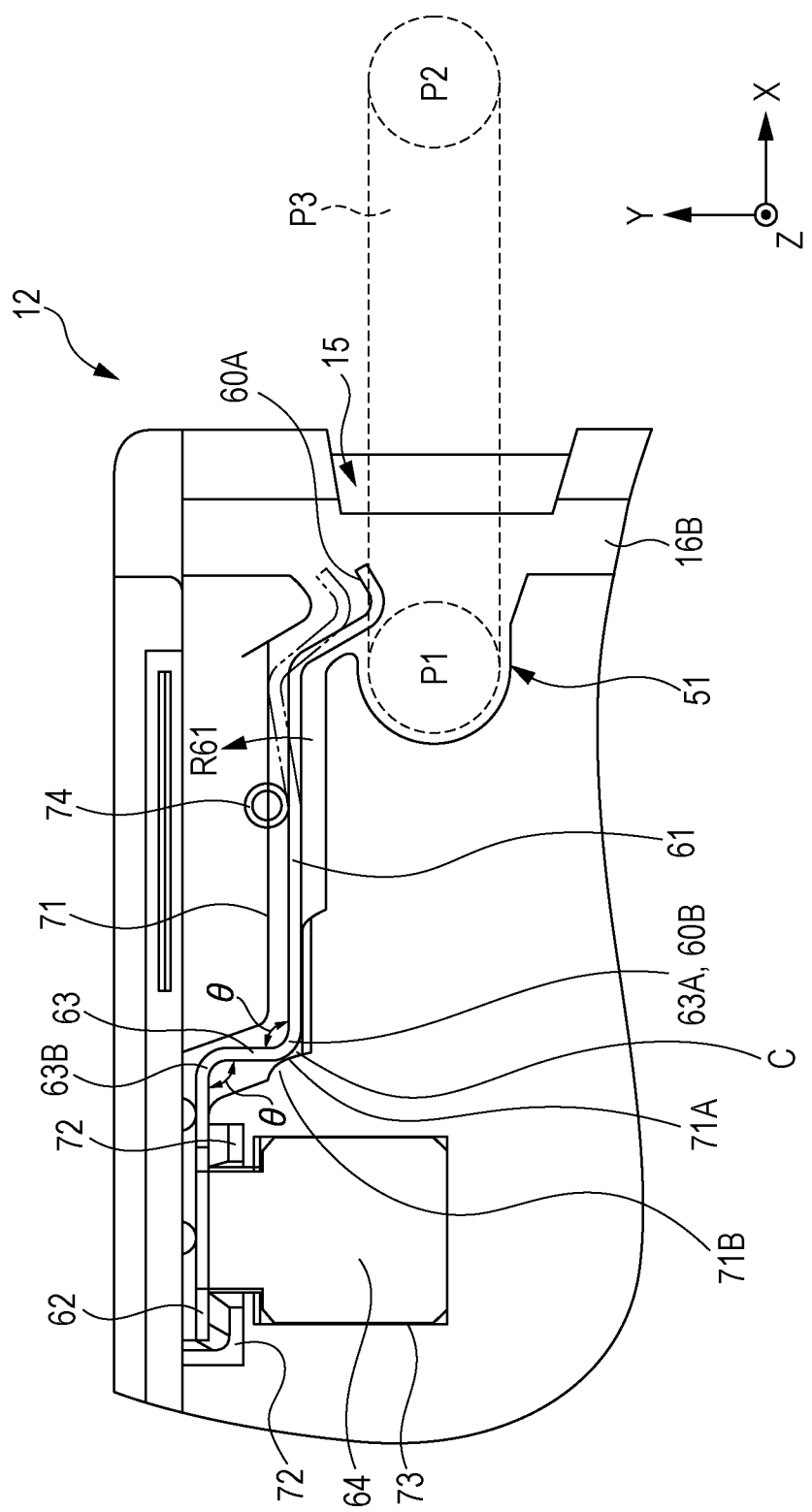
FIG. 7 is a top view of the retention clip and the lower shell of the cartridge main body illustrated in FIG. 6.

FIG. 6 illustrates a state where the leader pin 50 and the retention clip 60 illustrated in FIG. 3 are mounted on the lower shell 12 of the cartridge main body 10. FIG. 7 illustrates the configuration of the retention clip 60 and the lower shell 12 of the cartridge main body 10 illustrated in FIG. 6 when viewed from the top.

In FIG. 6 and the drawings subsequent thereto and in the description below, the direction in which the upper shell 11 faces the lower shell 12 is set to a Z direction, the direction in which the retention clip 60 enters the tape pull-out port 15 is set to an X direction, and the direction that is perpendicular to the X direction and the Z direction is set to a Y direction.

The cartridge main body 10, for example, includes an accommodating groove 71, a support rib 72, and a recess portion 73. The accommodating groove 71 accommodates the elastic member 61 and the connecting member 63. A convex portion 74 is disposed in the middle of the accommodating groove 71. The convex portion 74 has a shape of a semicircle and is the fulcrum of the elastic member 61 where the elastic deformation thereof occurs. The support rib 72 retains the attaching member 62 in a manner in which the attaching member 62 is interposed between the support rib 72 and the inner surface of the cartridge main body 10. The recess portion 73 defines the position of the attachment of the plate surface member 64. The accommodating groove 71 and the recess portion 73 are disposed at the same depth as that of the pin retaining portion 51 where the leader pin 50 is accommodated.

The leader pin 50 can move between a first position P1 where the leader pin 50 is received in the cartridge main body 10, that is, the pin retaining portion 51 and a second position P2 where the leader pin 50 is taken out of the cartridge main body, that is, the tape drive device (not illustrated) side. The elastic member 61 of the retention clip 60 can elastically deform following the movement of the leader pin 50 along with the curved tip end portion 60A protruding on a path P3 of the movement of the leader pin 50. The retention clip 60 includes an abutting portion 60B that can abut on the cartridge main body 10 in response to the movement of the leader pin 50. Accordingly, variations in the position of the retention clip 60 in the cartridge main body 10 can be suppressed in the magnetic tape cartridge 1.

There is no particular limitation on which part of the retention clip 60 the abutting portion 60B is disposed. However, the abutting portion 60B, for example, is preferably disposed in the connecting member 63. Specifically, the connecting member 63 preferably includes the first bent portion 63A on the elastic member 61 side and the second bent portion 63B on the attaching member 62 side, and the abutting portion 60B is preferably configured by the first bent portion 63A. Accordingly, as will be described below, this can regulate excessive variations in the position of the retention clip 60 that are accompanied by the return of the leader pin 50 from the second position P2 to the first position P1.

The first bent portion 63A and the second bent portion 63B preferably have an angle of bending θ of a right angle or an approximately right angle with respect to the attaching member 62 or the elastic member 61. The reason is as follows. Variations occur in the angle of bending θ of the first bent portion 63A and the second bent portion 63B. These variations in the angle of bending θ lead to variations in the position of the curved tip end portion 60A of the retention clip 60. Setting the angle of bending θ to a right angle or to an approximately right angle can reduce variations in the position of the tip end portion 60A. In addition, a clearance C that will be described below can be decreased, and the effect of the abutting portion 60B can be further increased.

Figure 8:
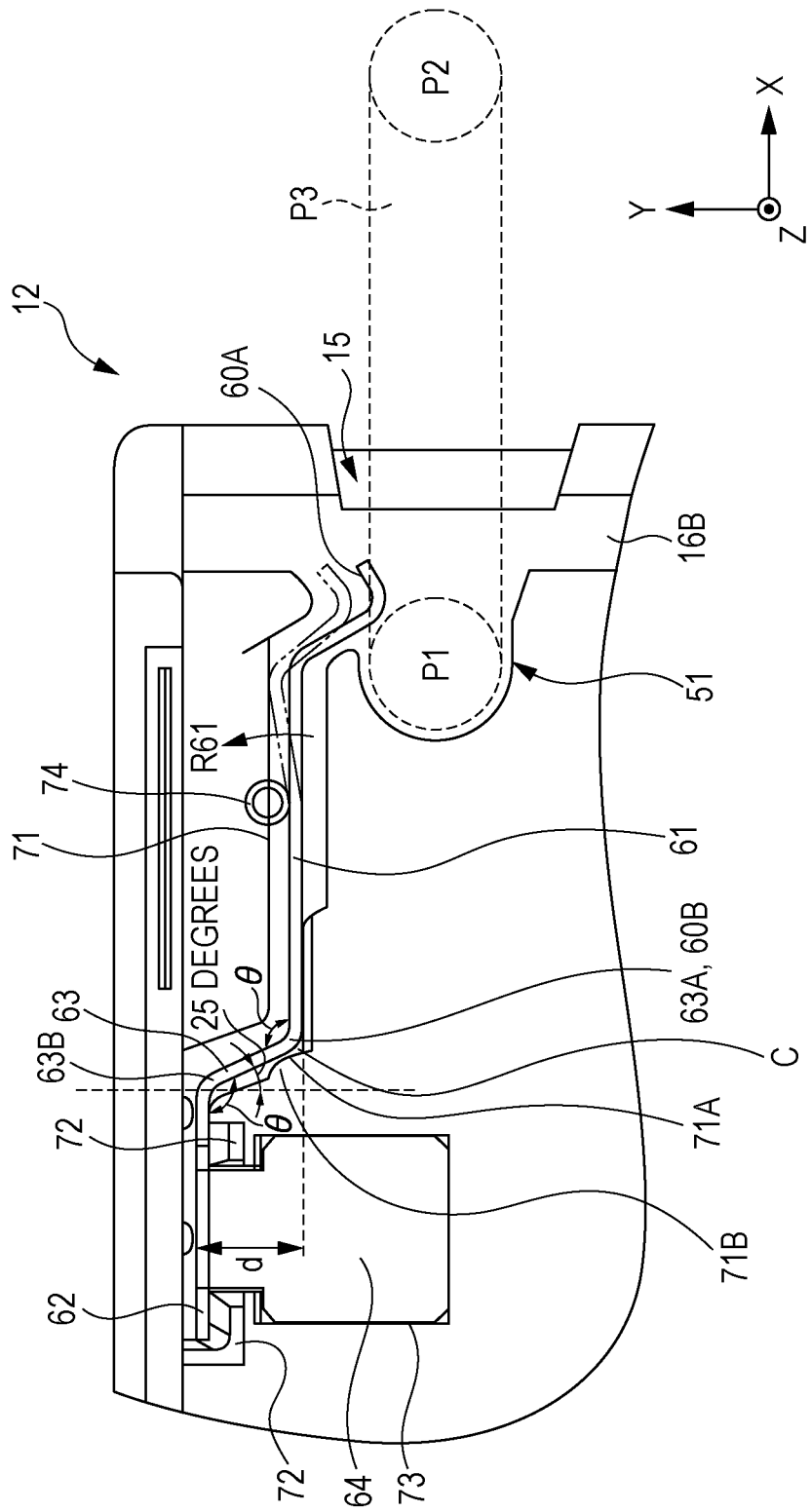
FIG. 8 is a top view illustrating the configuration of a retention clip and a lower shell of a cartridge main body in a first reference example.
Figure 9:
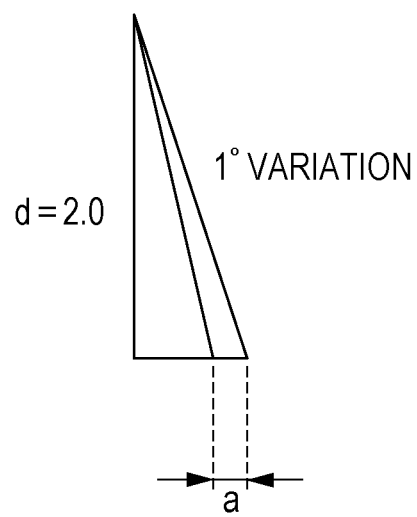
FIG. 9 is a diagram for describing variations in the position of the tip end portion of the retention clip when the angle of bending of the retention clip varies 1° in the first reference example.

FIG. 8 illustrates the configuration of a first reference example in which the angle of bending θ is set to an obtuse angle, and the first bent portion 63A and the second bent portion 63B are further bent, for example, 25° beyond 90° outward. In the first reference example, given that a Y-direction distance d between the attaching member 62 and the elastic member 61 is set to 2.0 mm when a variation of 1° occurs in the angle of bending θ, as illustrated in FIG. 9, a variation a in the position of the tip end portion 60A in the X direction is as follows: a =2.0 tan 26°−2.0 tan 25°=0.043 mm.

Figure 10:
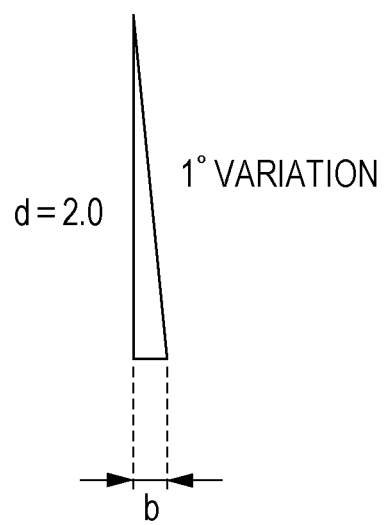
FIG. 10 is a diagram for describing variations in the position of the tip end portion of the retention clip when the angle of bending of the retention clip illustrated in FIG. 7 varies 1°.

On the contrary, when the angle of bending θ is set to 90°, and a variation of 1° occurs in the angle of bending θ, as illustrated in FIG. 10, a variation b in the position of the tip end portion 60A in the X direction is as follows: b=2.0 tan 1°=0.034 mm. Accordingly, the variation b in the position of the tip end portion 60A in the X direction is decreased approximately 8% per variation of 1° in the angle of bending θ when compared with the variation a in the first reference example.

The "angle of bending θ of a right angle or an approximately right angle" referred hereto includes not only a geometric right angle (90 °) but also a range of angles that can be referred to as a substantially right angle, for example, within a range of 90° plus-minus 5°.

There is no particular limitation on which part of the cartridge main body 10 the abutting portion 60B illustrated in FIG. 7 abuts on. However, the abutting portion 60B, for example, can preferably abut on the accommodating groove 71.

Specifically, the accommodating groove 71 preferably includes a receiving portion 71A where the abutting portion 60B can abut in response to the movement of the leader pin 50, and the receiving portion 71A is preferably a surface that is inclined toward the attaching member 62 or the elastic member 61. Such a configuration can clearly specify the part of the cartridge main body 10 where the abutting portion 60B abuts.

In addition, such a receiving portion 71A is preferably a protruding portion 71B that has a shape of a step and is disposed in the accommodating groove 71. Accordingly, the clearance C that will be described below can be easily adjusted. The protruding portion 71B may not be necessarily disposed.

Furthermore, an inside radius R of the first bent portion 63A and the second bent portion 63B illustrated in FIG. 7, for example, is preferably smaller than or equal to 1.0 mm. When the inside radius R is great, the bending is not stabilized, and springback easily occurs. When the inside radius R is small, cracks easily occur at the time of bending, and this may be a cause of breakage. Setting the inside radius R of the first bent portion 63A and the second bent portion 63B to be smaller than or equal to 1.0 mm can stabilize the angle of bending θ and secure the strength of the first bent portion 63A and the second bent portion 63B.

The magnetic tape cartridge 1 operates as follows.

When the magnetic tape cartridge 1 is in use, the sliding door 16 of the tape pull-out port 15 is opened, and the leader pin 50 is taken out of the pin retaining portion 51 (first position P1) in the cartridge main body 10 to the second position P2 outside the cartridge main body, for example, in the tape drive device (not illustrated). Concurrently, the magnetic tape 20 is unwound from the reel 30, and an operation of reading or writing information on the magnetic tape 20 is performed in the tape drive device (not illustrated).

Meanwhile, when the use of the magnetic tape cartridge 1 is finished in the tape drive device (not illustrated), the magnetic tape 20 is wound onto the reel 30, and the leader pin 50 moves from the second position P2 toward the pin retaining portion 51 (first position P1) in the cartridge main body 10. At this time, the leader pin 50 allows the elastic member 61 of the retention clip 60 to elastically deform approximately in the Y direction as illustrated by an arrow R61 with the convex portion 74 as the fulcrum. The leader pin 50 rides over the curved tip end portion 60A and is received at a predetermined position, that is, in the pin retaining portion 51 (first position P1) in the cartridge main body 10.

Figure 11:
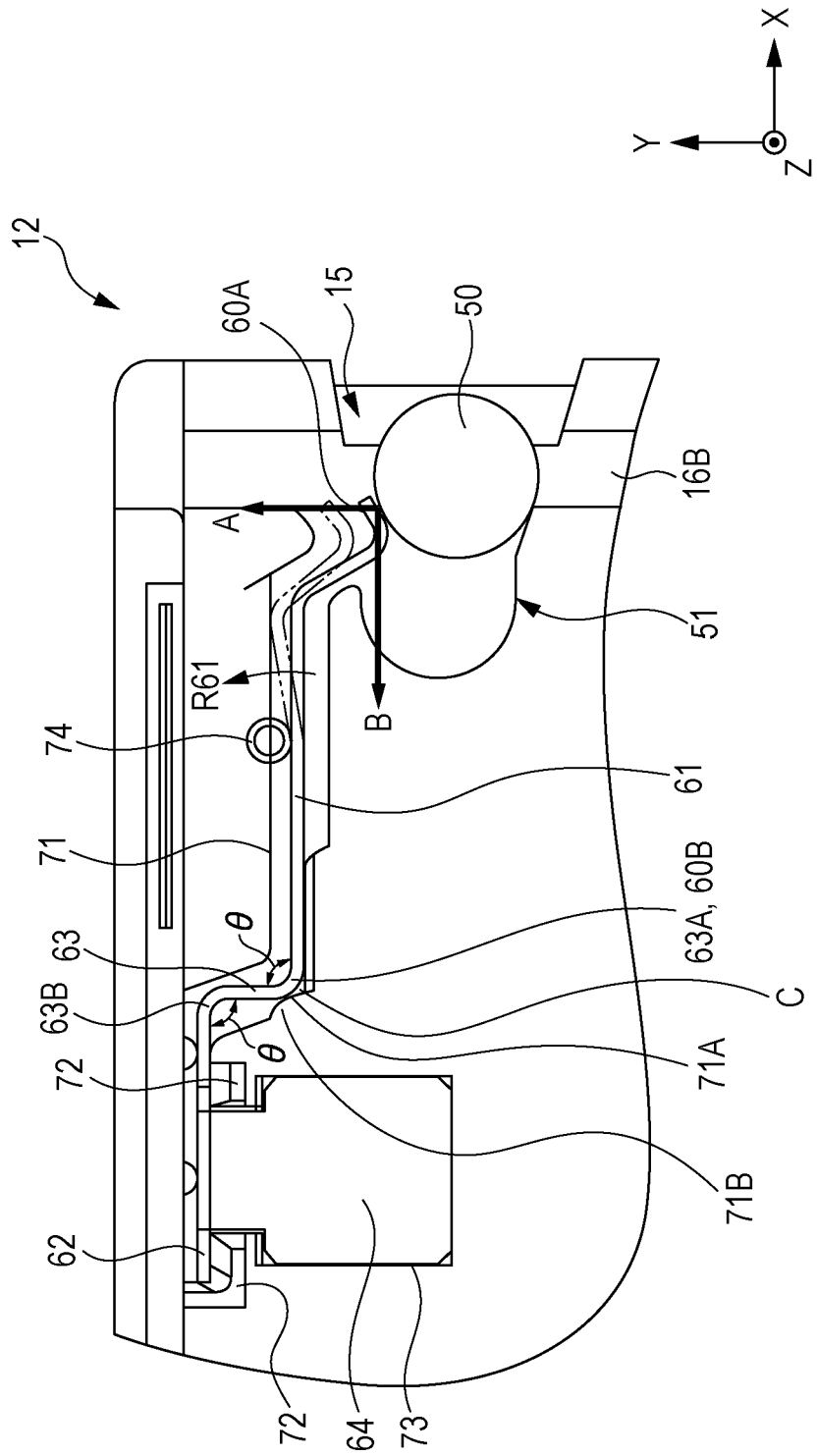
FIG. 11 is a plan view for describing forces applied to the retention clip illustrated in FIG. 7 in two directions when the leader pin rides over the curved tip end portion.

When the leader pin 50 rides over the curved tip end portion 60A, two forces occur in the curved tip end portion 60A as illustrated in FIG. 11: one in the direction of deforming the spring (A direction) and the other in the direction of insertion of the leader pin 50 (B direction). The force in the B direction is a force that allows the retention clip 60 to move in the B direction in the cartridge main body 10. The movement of the retention clip 60 in the B direction causes the position of the tip end portion 60A to vary. Accordingly, this is a cause of variations in the spring force of the elastic member 61.

The retention clip 60 here includes the abutting portion 60B that can abut on the cartridge main body 10 in response to the movement of the leader pin 50. Accordingly, when the position of the retention clip 60 varies in the B direction because of the movement of the leader pin 50, the abutting portion 60B abuts on the cartridge main body 10, and this regulates the variations in the position so that the extent of variations does not increase anymore. That is to say, the abutting portion 60B can function as a stopper. Accordingly, variations in the position of the tip end portion 60A are suppressed, and this suppresses variations in the spring force of the elastic member 61.

As illustrated in the same FIG. 11, when the leader pin 50 is in the pin retaining portion 51 (first position P1), the clearance C is preferably disposed between the abutting portion 60B, that is, the first bent portion 63A and the accommodating groove 71. When the clearance C is not disposed, the retention clip 60 may override the outside of the accommodating groove 71 at the time of assembly. By disposing the clearance C, the retention clip 60 can be easily installed in the accommodating groove 71, and the efficiency of the assembly work improves. In FIG. 7 and FIG. 11, the abutting portion 60B, that is, the first bent portion 63A and the accommodating groove 71 seem to be in contact with each other since the clearance C is very small.

Figure 12:
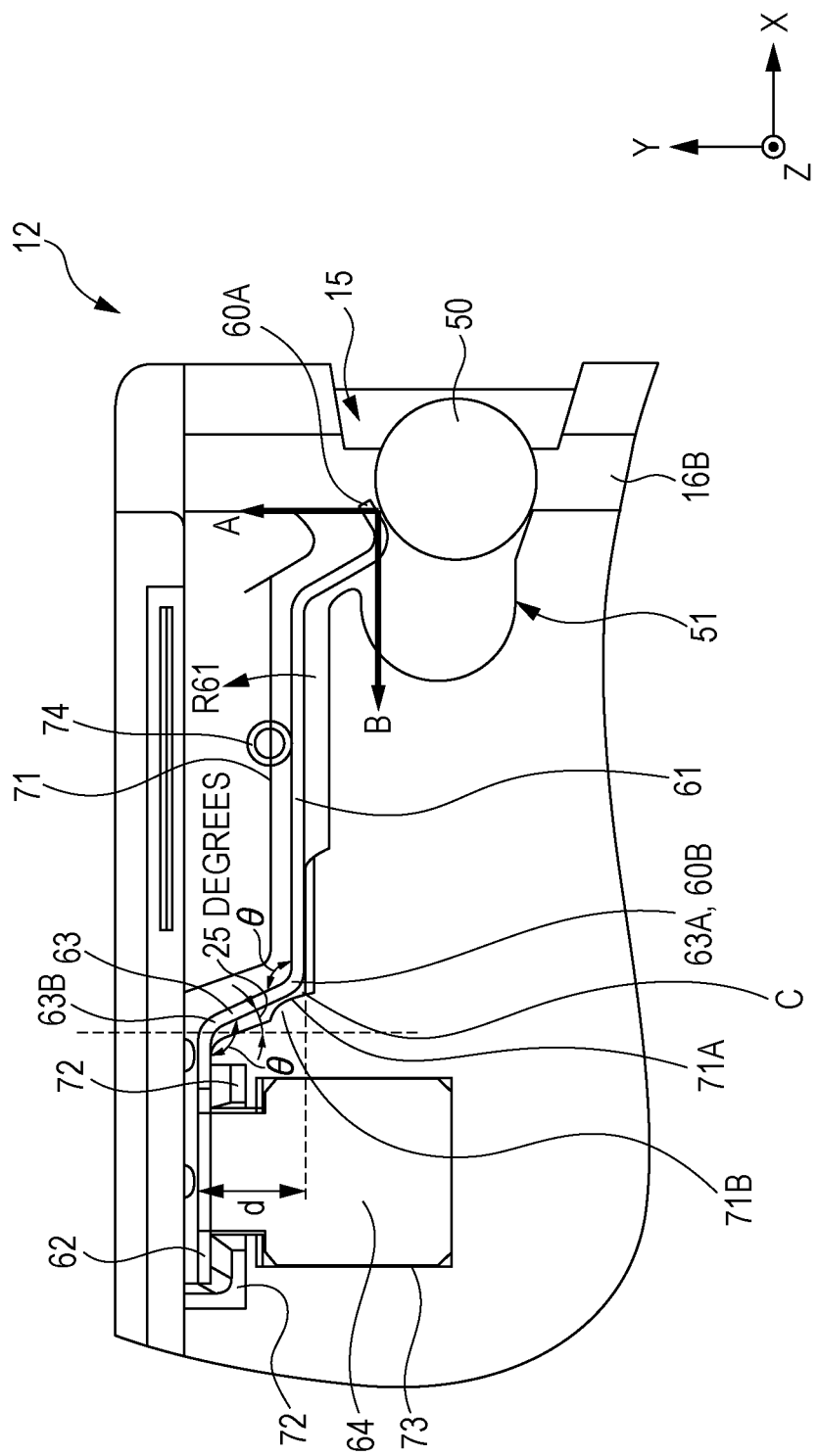
FIG. 12 is a plan view for describing forces applied to the retention clip in the first reference example in two directions when the leader pin rides over the curved tip end portion.

On the contrary, FIG. 12 illustrates a case where the leader pin 50 is about to return to the first position P1 from the second position P2 in the first reference example in which the angle of bending θ is set to an obtuse angle. Even in the first reference example, as described above, the force in the direction of deforming the spring (A direction) and the force in the direction of insertion of the leader pin 50 (B direction) occur in the curved tip end portion 60A when the leader pin 50 rides over the curved tip end portion 60A. However, in the first reference example, the clearance C between the first bent portion 63A and the accommodating groove 71 becomes great since the angle of bending θ is an obtuse angle. For this, the first bent portion 63A does not abut on the accommodating groove 71 even though the retention clip 60 moves in the B direction, and variations in the position of the tip end portion 60A become great. Variations in the spring force of the elastic member 61 also increase. That is to say, the first bent portion 63A is not assumed to function as a stopper in the first reference example.

In the present embodiment, the abutting portion 60B that can abut on the cartridge main body 10 in response to the movement of the leader pin 50 is disposed in the retention clip 60. Accordingly, the abutting portion 60B can function as a stopper, and variations in the position of the retention clip 60 can be suppressed in the cartridge main body 10.

Since the angle of bending θ of the first bent portion 63A and the second bent portion 63B is set to a right angle or an approximately right angle with respect to the attaching member 62 or the elastic member 61, this can reduce variations in the position of the curved tip end portion 60A of the retention clip 60 that are a cause of variations in the angle of bending θ. In addition, the clearance C between the first bent portion 63A and the accommodating groove 71 can be small, and the effect of the abutting portion 60B can be further increased.

Furthermore, since the inside radius R of the first bent portion 63A and the second bent portion 63B, for example, is set to be smaller than or equal to 1.0 mm, the angle of bending θ can be stabilized, and the strength of the first bent portion 63A and the second bent portion 63B can be secured.

First Modification Example

The embodiment above is described as a case where the first bent portion 63A and the second bent portion 63B have the angle of bending θ of a right angle or an approximately right angle, and the receiving portion 71A of the accommodating groove 71 is an inclined surface. However, as illustrated in FIG. 13, the first bent portion 63A and the second bent portion 63B can also have the angle of bending θ of an acute angle. The "angle of bending θ of an acute angle" referred hereto, for example, is preferably within a range of greater than or equal to 85° and smaller than 90°. In this case, the receiving portion 71A of the accommodating groove 71 preferably has a right angle or an approximately right angle (for example, within a range of 90° plus-minus 5°) with respect to the attaching member 62 or the elastic member 61.

Although the present disclosure is described with the embodiment as an example hereinbefore, the present disclosure is not limited to the embodiment described above, and various modifications can be made. For example, there is no limitation on the shape, the dimension, the material, and the like of each constituent described in the above embodiment. Each constituent may have other shapes, dimensions, and materials.

Although, for example, the configuration of the magnetic tape cartridge 1 is described with a specific example in the embodiment described above, the magnetic tape cartridge 1 may not be necessarily provided with all the constituents thereof and may be further provided with other constituents.

The present disclosure can be further applied to magnetic tape cartridges besides those of the LTO format.

The effect described in the present specification is only for purposes of illustration and not for limitation. Other effects may be present.

The present application can also have the following configurations.

(1) A magnetic tape cartridge including a reel that is capable of winding a magnetic tape thereonto, a cartridge main body that is capable of accommodating the reel, a leader pin that is attached to the magnetic tape wound onto the reel and is capable of moving between a first position where the leader pin is accommodated in the cartridge main body and a second position where the leader pin is taken out of the cartridge main body, and a retention clip that is disposed in the cartridge main body and includes an elastic member which is capable of deforming elastically following the movement of the leader pin along with a tip end portion protruding on the path of the movement of the leader pin, in which the retention clip includes an abutting portion that is capable of abutting on the cartridge main body in response to the movement of the leader pin.

(2) The magnetic tape cartridge according to (1), in which the retention clip includes the elastic member, an attaching member that is capable of attaching to an inner surface of the cartridge main body, and a connecting member that connects the attaching member and the elastic member, and the abutting portion is disposed in the connecting member.

(3) The magnetic tape cartridge according to (2), in which the cartridge main body includes an accommodating groove that accommodates the elastic member and the connecting member, and the abutting portion is capable of abutting on the accommodating groove in response to the movement of the leader pin.

(4) The magnetic tape cartridge according to (3), in which a clearance is disposed between the abutting portion and the accommodating groove when the leader pin is at the first position.

(5) The magnetic tape cartridge according to (3) or (4), in which the abutting portion is capable of abutting on the accommodating groove in response to the movement of the leader pin from the second position to the first position.

(6) The magnetic tape cartridge according to any one of (2) to (5), in which the connecting member includes a first bent portion on the elastic member side and a second bent portion on the attaching member side, and the abutting portion is configured by the first bent portion.

(7) The magnetic tape cartridge according to (6), in which the first bent portion and the second bent portion have an angle of bending of a right angle or an approximately right angle with respect to the attaching member or the elastic member.

(8) The magnetic tape cartridge according to (7), in which the angle of bending of a right angle or an approximately right angle is within a range of 90° plus-minus 5°.

(9) The magnetic tape cartridge according to (7) or (8), in which the accommodating groove includes a receiving portion on which the abutting portion is capable of abutting in response to the movement of the leader pin, and the receiving portion is a surface that is inclined to the attaching member or the elastic member.

(10) The magnetic tape cartridge according to (9), in which the receiving portion is a protruding portion that is disposed in the accommodating groove.

(11) The magnetic tape cartridge according to (6), in which the first bent portion and the second bent portion have an angle of bending of an acute angle.

(12) The magnetic tape cartridge according to (11), in which the angle of bending of an acute angle is within a range of greater than or equal to 85° and smaller than 90°.

(13) The magnetic tape cartridge according to (11) or (12), in which the accommodating groove includes a receiving portion on which the abutting portion is capable of abutting in response to the movement of the leader pin, and the receiving portion has an angle of a right angle or an approximately right angle with respect to the attaching member or the elastic member.

(14) The magnetic tape cartridge according to any one of (6) to (13), in which an inside radius of the first bent portion and the second bent portion is smaller than or equal to 1.0 mm.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A magnetic tape cartridge comprising:

a reel that is capable of winding a magnetic tape thereonto;

a cartridge main body that is capable of accommodating the reel;

a leader pin that is attached to the magnetic tape wound onto the reel and is capable of moving between a first position where the leader pin is accommodated in the cartridge main body and a second position where the leader pin is taken out of the cartridge main body; and a retention clip that is disposed in the cartridge main body and includes an elastic member which is capable of deforming elastically following the movement of the leader pin along with a tip end portion protruding on the path of the movement of the leader pin, wherein the retention clip includes an abutting portion that is capable of abutting on the cartridge main body in response to the movement of the leader pin, wherein the retention clip includes the elastic member,
an attaching member that is capable of attaching to an inner surface of the cartridge main body, and
a connecting member that connects the attaching member and the elastic member, and
the abutting portion is disposed in the connecting member,
wherein the connecting member includes a first bent portion on the elastic member side and a second bent portion on the attaching member side, and the abutting portion is configured by the first bent portion,
wherein an accommodating groove of the cartridge main body includes a receiving portion on which the abutting portion is capable of abutting in response to the movement of the leader pin, and
the receiving portion is a surface that is inclined to the attaching member or the elastic member.

2. The magnetic tape cartridge according to claim 1, wherein the cartridge main body includes an accommodating groove that accommodates the elastic member and the connecting member, and
the abutting portion is capable of abutting on the accommodating groove in response to the movement of the leader pin.

3. The magnetic tape cartridge according to claim 2, wherein a clearance is disposed between the abutting portion and the accommodating groove when the leader pin is at the first position.

4. The magnetic tape cartridge according to claim 2, wherein the abutting portion is capable of abutting on the accommodating groove in response to the movement of the leader pin from the second position to the first position.

5. The magnetic tape cartridge according to claim 1, wherein the first bent portion and the second bent portion have an angle of bending of a right angle or an approximately right angle with respect to the attaching member or the elastic member.

6. The magnetic tape cartridge according to claim 5, wherein the angle of bending of a right angle or an approximately right angle is within a range of 90° plus-minus 5°.

7. The magnetic tape cartridge according to claim 5, wherein the receiving portion is a protruding portion that is disposed in the accommodating groove.

8. The magnetic tape cartridge according to claim 1, wherein the first bent portion and the second bent portion have an angle of bending of an acute angle.

9. The magnetic tape cartridge according to claim 8, wherein the angle of bending of an acute angle is within a range of greater than or equal to 85° and smaller than 90°.

10. The magnetic tape cartridge according to claim 8, wherein the accommodating groove includes a receiving portion on which the abutting portion is capable of abutting in response to the movement of the leader pin, and
the receiving portion has an angle of a right angle or an approximately right angle with respect to the attaching member or the elastic member.

11. The magnetic tape cartridge according to claim 1, wherein an inside radius of the first bent portion and the second bent portion is smaller than or equal to 1.0 mm.

* * * * *